United States Patent
Correll

[15] 3,684,927
[45] Aug. 15, 1972

[54] ELECTROLYTIC CAPACITOR WITH IMPROVED SEAL

[72] Inventor: Edward M. Correll, West Columbia, S.C.

[73] Assignee: General Electric Company

[22] Filed: July 12, 1971

[21] Appl. No.: 161,841

[52] U.S. Cl. .................................. 317/230, 29/570
[51] Int. Cl. .............................................. H01g 9/10
[58] Field of Search ..................... 317/230, 231, 233

[56] References Cited

UNITED STATES PATENTS

| | | |
|---|---|---|
| 3,248,613 | 4/1966 | Griffin et al. ............... 317/230 |
| 3,321,675 | 5/1967 | Diggens ..................... 317/230 |
| 3,302,072 | 1/1967 | O'Neil ....................... 317/230 |
| 3,534,230 | 10/1970 | Krasienko et al. .......... 317/230 |

Primary Examiner—James D. Kallam
Attorney—Nathan J. Cornfeld et al.

[57] ABSTRACT

An electrolytic capacitor is provided with improved sealing means comprising an adhesive seal between the primary, elastomeric seal and the secondary, hermetic glass-to-metal seal to prevent reaction between the electrolyte and exposed metallic portions adjacent the glass-to-metal seal.

3 Claims, 3 Drawing Figures

PATENTED AUG 15 1972

3,684,927

INVENTOR:
EDWARD M. CORRELL,
BY John P Taylor
HIS ATTORNEY.

ELECTROLYTIC CAPACITOR WITH IMPROVED SEAL

BACKGROUND OF THE INVENTION

This invention relates to electrolytic capacitors. More particularly, the invention relates to hermetically sealed electrolytic capacitors having glass-to-metal or ceramic-to-metal seals.

Electrolyte leakage from sealed electrolytic capacitors under abnormal conditions, such as, pressure or temperature extremes in the surrounding environment have resulted in a number of seal constructions all having the common goal of eliminating electrolyte leakage. While this primary problem of leakage of the electrolyte from within the can to the external surroundings can be solved by the use of glass-to-metal or ceramic-to-metal sealing techniques, other problems have been encountered in the course of this solution. Conventional capacitors of this type normally comprise a sintered slug of an oxide-forming metal, such as, for example, tantalum, having a lead of the same metal incorporated therein which becomes the anode lead. The slug is commonly mounted within a cylindrical metal case or can which may form the cathode lead for the material and electrolyte is placed therebetween. Elastomeric materials are placed around the lead adjacent the open end of the can and the elastomeric materials are expected to form a primary seal to prevent passage of the electrolyte therethrough. Beyond this elastomeric seal a glass-to-metal seal or ceramic-to-metal seal is used. The glass-to-metal seal comprises a center metallic member which may be a solid rod or a hollow tube having a glass bead bonded thereto and a metal sleeve around the glass bead and bonded thereto. The central lead or tube is in turn fastened, such as by welding, to the anode lead and the metal sleeve is then soldered or welded to the case. The resulting glass-to-metal seal provides an hermetic seal through which the electrolyte cannot pass.

The problem, however, which has been created is that the materials used for the glass-to-metal seal, particularly the metal materials may react with the electrolyte if a portion of the electrolyte penetrates the primary, elastomeric, seal. If, for example, the metal tube or rod, bonded to the glass bead and subsequently fastened to the anode lead is not of a film-forming metal such as tantalum, any electrolyte passing through the primary seal may form a shorting bridge between the tube or rod and the case. Even when the tube or rod is made of a film-forming material such as tantalum, a problem may arise if the material has not been previously anodized. This is because the electrolyte penetration forms a temporary high current path while the oxide film is being formed. This can result in a short "spike" or current surge which may have a deleterious effect upon the circuitry in which the capacitor is incorporated.

Many improvements on the elastomeric primary seal have been proposed to avoid the penetration of the electrolyte therethrough. Obviously, however, the very presence of the secondary glass-to-metal seal is indicative of the fact that the primary elastomeric seals are not absolutely electrolyte leakage-proof. Thus, the problem or possibility of leakage through the primary elastomeric seal must be reckoned and dealt with.

It has been proposed to provide another compression seal around the lead adjacent to the glass to protect the tube from electrolyte attack. Maintaining the compression while attaching the glass-to-metal seal, however, presents additional manufacturing expense. Also, the temperature extremes previously referred to may provide further complications because the resiliency of the material, upon which the compression seal depends, may change considerably through the temperature range to which the device may be exposed resulting in loss of compression and possible failure of the seal.

It is therefore an object of this invention to provide means to protect the metallic portions of the glass-to-metal seals from electrolyte attack. It is a further object of the invention to isolate portions of the glass-to-metal seal from the electrolyte by an adhesive seal independent of the primary elastomeric seal. Other objects of the invention will be apparent from the disclosure and drawings.

DESCRIPTION OF THE INVENTION

Figure 1:
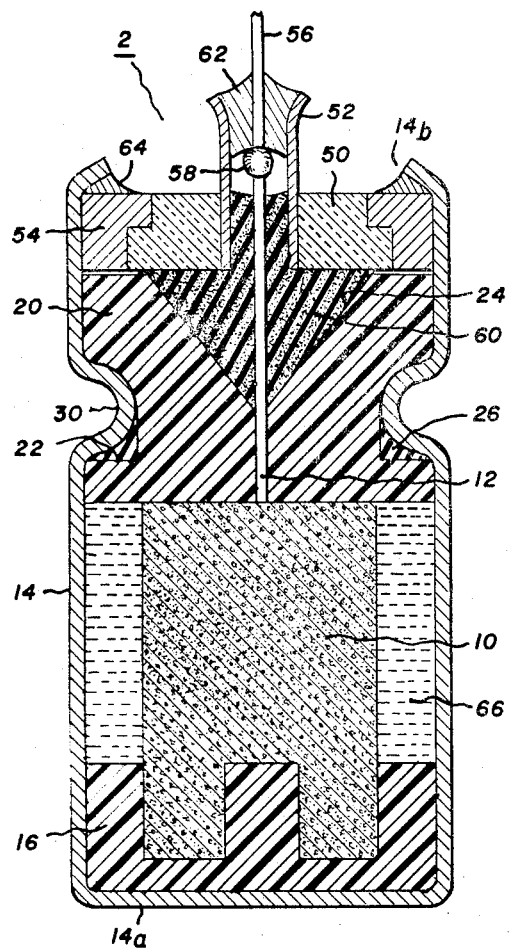
FIG. 1 is a cross-sectional view of the invention.
Figure 2:
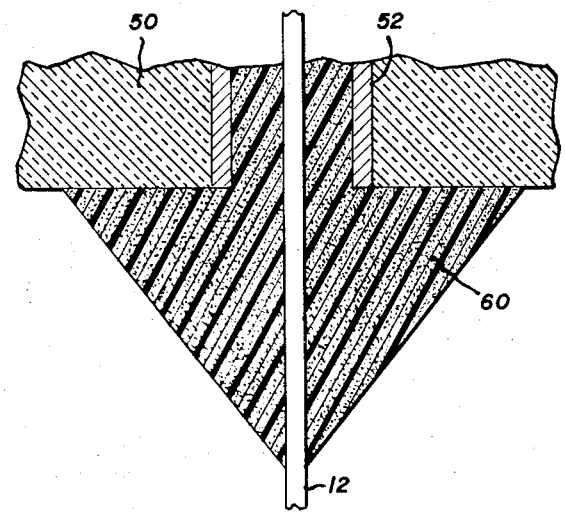
FIG. 2 is an enlarged, fragmentary view of a portion of FIG. 1.

Referring now to FIGS. 1 and 2, a capacitor is generally indicated at 2 comprising a wet slug, electrolytic capacitor which, in the illustrated embodiment, comprises a sintered tantalum anode 10 which has previously been formed or anodized to provide a thin dielectric layer of tantalum oxide thereon as the dielectric material. The anode is mounted in a cylindrical case 14 having a closed end 14a and an open end 14b. The anode is centrally positioned therein by a spacer member 16 resting on the closed end 14a of case 14. A tantalum lead 12 is centrally positioned in the anode and extends toward the open end of case 14.

Elastomeric seal means and glass-to-metal seal means are provided adjacent to the open end 14b to seal case 14 as will be described below. A cylindrical bushing 20, having a diameter approximately equal to the I.D. of case 14 and comprising a relatively inert plastic material, such as polytetrafluoroethylene, is inserted into open end 14b of case 14 above anode 10. Bushing 20 is centrally punctured by lead 12 to form a seal therebetween as will be later described.

Bushing 20 is also formed with an annular groove 22 into which an O-ring 26 is placed. Case 14 is subsequently crimped at 30 to press the metal case into the bushing slightly above the groove to thereby compress O-ring 26 into sealing engagement between bushing 20 and case 14. Bushing 20 is also provided with a central depression 24 which may be cone-shaped for a purpose which will be described presently.

Above bushing 20, a glass-to-metal seal is provided comprising a glass bead 50 having a central, metallic, tube 52 bonded thereto and an outer, metallic, sleeve 54 also bonded thereto. The seal may be a matched coefficient seal or a compression type of seal. Glass-to-metal seals which can be used in the invention include, for example, those described and claimed in Merritt et al. U.S. Pat. No. 3,275,901 assigned to the assignee of this invention or in my copending application, Ser. No.

889,004. The exact choice of glass material will depend, among other things, upon the type of electrolyte. A solderable lead 56 comprising a metal such as nickel or copper is welded at 58 to the tantalum lead 12 to form an extension thereof. The position of this weld is slightly below the top of tube 52 so that only the solderable lead extension 56 of tantalum lead 12 extends beyond the top of tube 52. The glass-to-metal seal is mounted into the open end 14b of case 14 and sealed thereto by soldering tube 52 to solderable lead 56 and soldering or welding metallic sleeve or ring 54 to case 14 as shown respectively at 62 and 64. Thus, the capacitor is completely sealed by metal-to-metal and metal-to-glass seals. Alternatively, the glass portion may be replaced by a ceramic member to which the metal portions are bonded by techniques known to those skilled in the art. The use of the term "glass-to-metal seal" herein is therefore intended to include both glass and ceramics.

Before the seals are mounted and secured to case 14, it must be filled with an electrolyte to provide the electrical connection between case 14 which forms the cathode lead and the interface of the anodized dielectric material. In the preferred embodiment, a sulfuric acid electrolyte is placed within case 14. This electrolyte, as is well known in the art, also serves to reoxidize or anodize any portion of the oxide dielectric layer which may break down during use. The electrolyte is basically contained within the space surrounding the anode by bushing 20 and O-ring 26. Minor amounts of electrolyte, however, may escape beyond this primary seal, either via the peripheral case wall or centrally between bushing 20 and lead 12. In either case, the sulfuric acid comes in contact with the metal and glass portions of the glass-to-metal seal. Glasses may be chosen having resistance to sulfuric acid and the amounts of acid which pass through the primary seal are minimal and thus attack of the metal portions of the glass-to-metal seals will not destroy the seal. It is, however, possible that a current leakage bridge may develop between the case 14 and the metallic tube 52 which is in electrical contact with anode 10. This, of course, provides a direct short between the cathode of the capacitor and the anode. In accordance with the invention, the formation of such a leakage bridge is prevented by encapsulating the exposed portions of tube 52 adjacent the glass-to-metal seal before the final sealing of case 14 to the glass-to-metal seal.

This is accomplished in accordance with the invention by filling the cavity 24 in bushing 20 with an adhesive material 60 such as a caulking compound or a curable, elastomeric material providing reasonable resistance to attack by electrolyte 66, and which will provide an adhesive bond or seal to the tantalum lead 12, the glass bead 50, and metallic tube 52 to prevent any passage of the electrolyte either via the periphery of case 14 or from the central opening in bushing 20 to reach tube 52. The terms adhesive bond or adhesive seal as used herein are intended to define a bond or seal formed by a material which will contact glass bead 50, tube 52, and lead 12 to form a reasonably electrolyte-impermeable seal or bond by an adhesive force rather than a compressive force. Thus, when the sealing material is exposed to wide extremes of temperature, the seal will not be affected since it depends upon the adhesive bond of the sealing material to the lead 12, the glass bead 50, and the metallic tube 52 rather than compression forces urging the sealing material against the aforementioned components. The advantages of this sealing mechanism are further evident from the fact that manufacturing tolerances relied upon for a compression seal may result in a lack of compression as the compressing member contracts at a very low temperature, while, on the other hand, any contraction of the adhesive seal results in a small space between the adhesive seal and the bushing 20 rather than a rupture of the bond between the sealing material and the glass bead, tube, and lead. This is because the bushing 20 is constructed of a relatively inert material such as polytetrafluoroethylene which will not form an adhesive bond with the sealant material.

The adhesive material preferably comprises a curable caulking material which is placed into cavity 24 before the glass-to-metal seal has been placed into open end 14b of case 14. Preferably, cavity 24 is filled level with the caulking material. After the caulking material has been placed in cavity 24 the glass-to-metal seal is placed into opening 14b of case 14 and glass bead 50 and tube 52 are brought into contact with the sealing material which is level with the top of cavity 24. Alternatively, if slightly less material is used, the assembly may be inverted after insertion of the glass-to-metal seal to cause some of the adhesive material to flow out of cavity 24 and contact both glass bead 50 and tube 52. If the caulking material is a non-curable material which stays soft and resilient the glass-to-metal seal may then be sealed as previously described by soldering lead 56 to tube 52 and ring 54 to case 14. If the material is a curable elastomer, the material is allowed to cure before the sealing operation to allow oxygen and moisture to penetrate into the material and assist in the curing.

While, as stated above, the caulking material may be a non-curable sealing material such as a soft, tarry material or other well known caulking compound having adhesive properties, preferably the sealing compound comprises a curable, elastomeric material such as a curable, silicone rubber or a fluorosilicone rubber which will form an adhesive bond to the glass and metal portions of the glass-to-metal seal and to the lead, yet, after curing, will retain its elastomeric quality thereby providing additional sealing qualities by virtue of the resiliency of the material. A preferred material is a room temperature curable silicone rubber such as, for example, the General Electric RTV 100 series adhesive sealants. Materials of this type are described more fully in Kulpa U.S. Pat. No. 3,296,161 and Beers U.S. Pat. No. 3,382,205 both assigned to the assignee of this invention.

Figure 3:
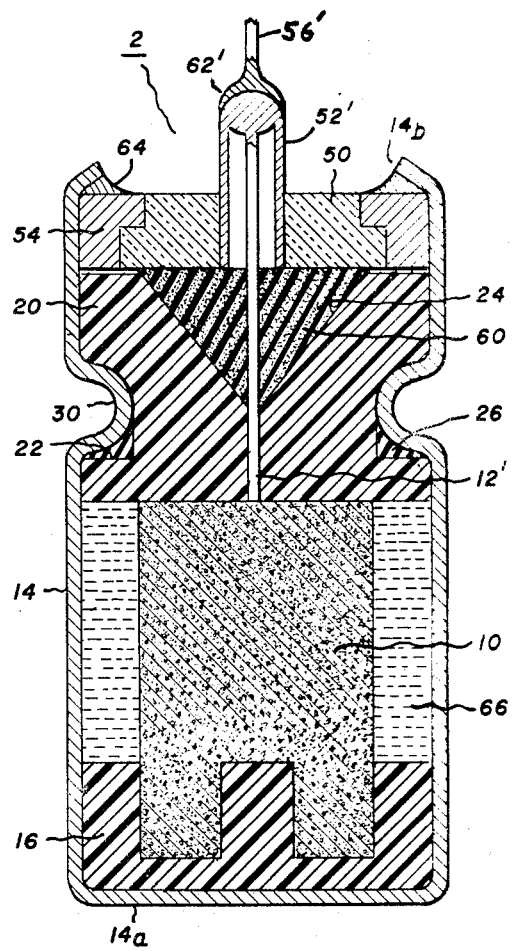
FIG. 3 is an alternate embodiment of the invention.

Turning now to FIG. 3, an alternate construction is illustrated wherein metal tube 52 is replaced by an oxidizable or film-forming metal tube 52' such as tantalum. In this construction tube 52' and lead 12' are welded together to close tube 52' and the solder joint 62 is replaced by a weld 62' which welds or bonds solderable lead 56' to lead 12' and tube 52'. Prior to making these welds the caulking material is placed in cavity 24 as in the preferred embodiment already described. In this embodiment the structure of the invention protects tube 52' identically to that of FIGS. 1 and 2 but for a slightly different reason. In the embodiment shown in FIGS. 1 and 2 the adhesive material is used to prevent the formation of a current leakage bridge. In this embodiment, the material is used to prevent the oxidization of the tantalum sleeve while the capacitor is in active use which oxidization would provide a momentary—but undesirable—surge of current.

To further test the efficiency of the seal of the invention capacitors using the seal of the inventions, were constructed similar to FIG. 3 and exposed to extended testing at 85° C and 125° C and the capacitance, dissipation factor, and DC leakage measured periodically to determine whether these parameters met the requirements of various military type specifications such as, for example, Mil–C–39006. After 10,000 hours of continuous testing the deviation of the capacitance, dissipation factor, and DC leakage did not exceed the allowable tolerances in the above specification.

Thus, the invention provides an improved seal structure for an electrolytic capacitor whereby the effect of any deleterious attack of the glass-to-metal seal by the electrolyte is mitigated by the isolation and encapsulation of the exposed metal anode portions of the glass-to-metal seal by an adhesive seal which bonds to the glass and to the metallic portions.

What I claim as new and desire to secure by Letters Patent of the United States is:

1. An improved electrolytic capacitor comprising a case having a closed end and an open end, an anode comprising a film-forming metal within the case and having a lead thereon of the same metal and generally positioned centrally with respect to said open end of said case, an insulating resilient sealing means surrounding said lead and contacting the inner surface of said case, a glass-to-metal seal closing said open end of said case and generally comprising a glass bead having sealed thereto a metallic tube centrally positioned therein and a metallic rim, said rim being sealed to said case and said tube being metallurgically bonded to said lead to provide an hermetic seal, the improvement comprising said sealing means having a cavity around said lead, an insulating adhesive material surrounding said lead in said cavity and forming an adhesive sealing bond with said lead, and adhesively sealing with said glass bead and metallic tube for preventing electrolyte of the capacitor from contacting said tube including said metallurgical bond.

2. The capacitor of claim 1 wherein said insulating adhesive material comprises a resilient, non-curing caulking compound.

3. The capacitor of claim 1 wherein said insulating adhesive material comprises a curable sealant.

* * * * *